(No Model.)
H. ESSEX.
MACHINE FOR MAKING WIRE NAILS.
No. 384,515. Patented June 12, 1888.
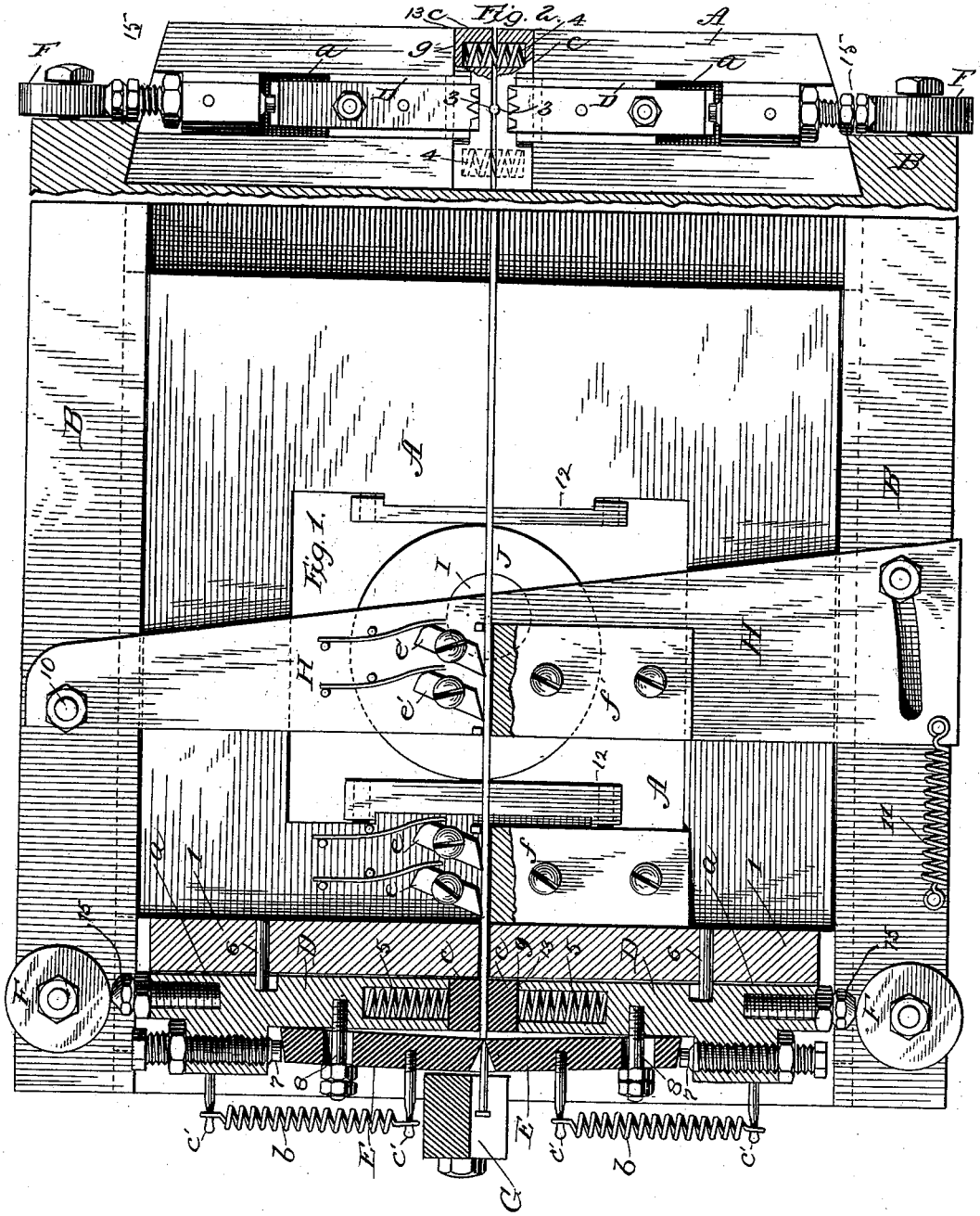
Attest:
Walter Donaldson
Frank L. Middleton
Inventor
Henry Essex.
by Ellis Spear.
Atty.

UNITED STATES PATENT OFFICE.

HENRY ESSEX, OF MEADVILLE, PENNSYLVANIA.

MACHINE FOR MAKING WIRE NAILS.

SPECIFICATION forming part of Letters Patent No. 384,515, dated June 12, 1888.

Application filed July 27, 1887. Serial No. 245,456. (No model.)

*To all whom it may concern:*

Be it known that I, HENRY ESSEX, of Meadville, in the county of Crawford and State of Pennsylvania, have invented a new and useful Improvement in Machines for Making Wire Nails; and I do hereby declare that the following is a full, clear, and exact description of the same.

My invention is an improved machine for forming nails out of wire.

The main object sought in the invention is to effect complete and rapid manufacture of such nails by a machine composed of very few parts. In this improved machine the grip and dies are carried upon a plate which moves in guides upon a bed-plate, and the grip and dies are operated by the change of the relative position in the plate carrying the grip and dies with the bed-plate. The dies which sever the wire also serve to upset the wire and form the head of the next succeeding nail. In addition to these leading features are the details of construction and arrangement thereof, all as set forth hereinafter, and shown in the accompanying drawings, in which—

Figure 1 is a side elevation of the machine, a portion thereof being shown in vertical section. Fig. 2 is a face view of the clamping and cutting devices with some parts omitted, and the supporting-plate for said devices.

In this machine I employ clamping and cutting or pointing devices so arranged with relation to each other that they not only perform their separate functions of holding and cutting or pointing the wire, but by their combined action serve the purpose of heading mechanism.

In the drawings a plate, A, has sliding connection with a plate, B. As shown, and in the general description, B is stationary and the plate A slides thereon; but the conditions may be reversed, as hereinafter explained. Reciprocating sliding movement is imparted to the plate A by means of a shaft, I, journaled in the plate B and carrying an eccentric, J, which works in an opening in the plate A against bearings 12 on the edges thereof, the bearings and eccentric being preferably removable for replacing when worn or to change the stroke. The forward end of the plate A has a rib, which forms a thickened extension. In the face of this is a groove, *a*, the sides of which are beveled to receive and hold the slides D. A hole in the rib, slightly enlarged laterally, is fitted to receive the wire and pass it to the gripper. In the groove *a* are the clamping-jaws forming the faces of a gripper bearing against the rear wall of the groove and on opposite sides of the wire as it emerges from the hole in the rib. They also extend laterally in a groove cut at right angles to the groove *a*. The faces of the jaws have grooves 3 fitted to the wire. The jaws are normally held slightly apart by means of strong spiral springs 4 in sockets in the lateral extensions of the jaws. The jaws are limited in their opening movement by shoulders 13 of the transverse groove *g*, cut across the face of the thickened end of the plate A to receive the jaw extension. The rearward movement of the slides D is limited by the pins 6, set in the plate A and extending into slots in the slides, and they are held in their extreme outward position by springs 5 5, of less strength than springs 4, and set in sockets in the ends of the slides to bear against the backs of the jaws. The described inequality of the springs permits the jaws to separate as soon as the slides begin to retreat. These slides and the jaws form a grip, some form of which is an essential part of the machine. The slides also serve to carry the cutters, pointer, and header. This consists of a pair of dies, E E, connected to the slides by pins 8, set in the slides and passing through slots in the dies, with adjusting and lock nuts on their outer ends. The slots permit springs *b*, connecting-pins *c′ c′*, set in the die and slide, respectively, to hold the front ends of the dies normally outward, and the rear ends bear against studs 7 on adjusting-screws in the slides, so that the dies move forward with the slides, but may swing slightly in and out from the side of the gripper-jaws. The connection of the dies to the slides is practically a hinged connection with two adjustments, one forward and the other outward. The slides are forced in, causing the gripper-jaws and the dies to perform their work by means of a wedging action, as the positions of the plates A and B are relatively changed.

A convenient and simple mechanism for transmitting the direct motion of the plate and converting it into a lateral motion in the dies or clamps is shown in the drawings. On the bed-plate B is set, on each side and in range with the projecting ends of the slide, a stud or pin on which is a pressure-roller, F. These rollers serve as cam-faces for forcing inward the slides as the plate A moves forward. Of course the effect is the same whether the plate B be stationary and the plate A movable or the reverse. The turning of the rollers on their supporting-pins reduces the friction and facilitates the movement of the plate, as well as prevents the wear of the periphery of the roller and the bearing on the end of the slide. The end of the slide bears against the face of the roller, and is preferably made adjustable by means of the screw, the head of which projects into range with the roller, and the head of this screw, which bears upon the roller, is slightly flattened in order to hold the slides in their different positions long enough to complete the work, hereinafter described. An abutment, G, preferably fixed to the bed-plate in front of the dies, is set in such position that the advance of the plate A will bring the face of the gripper-jaws against the inner faces of the dies to perform the operation of heading, and for this the inner or cutting ends of the dies, when swung outwardly to the limit of their movement, which is the position when they advance to sever the wire, are far enough from the face of the gripper-jaws to leave a small portion of the wire projecting from the jaws, this small portion being sufficient to form the head. The parts are so arranged that as the plate A advances, or as the relative position of the plates is changed, the ends of the slides are brought into contact with the lateral projections and forced inward to sever the wire, and the continued movement of the plate immediately thereafter causes the dies to meet the abutment (or the abutment the dies) and forces the dies against the end of the wire, still held by the gripping-jaws by reason of the elongated faces of the end of the slide continuing to bear upon their supports on the roller. Thus the same dies which severed the wire are also made to act as headers, and by reason of their inclined faces they also serve as pointers.

The feeding mechanism is as follows, and in providing this mechanism I aim to utilize the movement of the plate or support A for the purpose of feeding the wire.

Immediately in rear of the boss on the plate A are pivoted spring-pawls $e\ e$, which bite the wire lying along the guide-plate $f$. They are pivoted so that backward movement of the plate will allow them to move freely along the wire; but when said movement is reversed the wire is engaged and held firmly in the position to which it has been projected forward. In order to prevent the wire being carried back to the limits of the backward strokes, a second set of spring-pawls, $e'\ e'$, and guide-plate $f'$ are supported in a manner similar to those just described, but upon an arm, H, which is in turn supported by the bed-plate B. These pawls do not allow backward passage of the wire under them, and thus when the plate has finished its backward stroke the wire at the front end projects sufficiently for the formation of a nail, and in the forward movement of the plate this position of the wire is retained by the first set of pawls. The clamps and cutters are not released from the wire at the moment the plate begins to move back, for the reason that the pressure-rollers bear for an appreciable time upon the projecting heads of the adjusting-screw after the commencement of said backward movement. It is necessary therefore to give the arm H, carrying the last set of pawls, a chance to be pushed back by the stiffness of the short lengths of the wire that is between the two sets of pawls until the clamps and cutters are opened sufficiently to let the wire pass freely between them. To accomplish this the arm H is pivoted to the bed-plate B at point 10, and at its opposite end is slotted to receive a cap-screw, by which it is properly held, and a spring, 11, returns the arm H to its normal position after it has been pushed slightly back by the stiffness of the wire. In action the effect of this arrangement is similar to that which would be produced were the clamps and cutters instantly released and the arm H rigid, and, in fact, the arm H is stationary for a portion of the backward stroke of the plate. The arm H, with the second set of pawls, may be positioned a sufficient distance away from the first set of pawls, so that the intervening portion of wire will be long enough to have a lateral or bending movement without danger of rupture or injury in any way from the first part of the backward movement of the plate, and when the clamps and cutters are apart far enough the spring of said intervening wire will cause it to straighten out again. In this case the arm H could be stationary, or if the usual straightening device that the wire has to pass through after leaving the coil be used to hold the wire firmly, the arm H could be entirely omitted. It is only necessary to have a holding grip equivalent to that on the arm H to hold the wire while the plate retreats.

The construction shown in the drawings has the advantage of wasting a minimum amount of wire at the end of each coil. Movement to the plate is imparted from a shaft, I, Fig. 1, by means of an eccentric, J, working within an opening in the plate and against suitable removable bearings, as 12 12. These, as also the eccentric, may be replaced by others to vary the stroke and consequently the length of the nails.

It will be understood that the ordinary mechanical equivalents may be provided in place of the presser-rollers—such as a stud or cam or incline—and the presser device may be arranged so that the clamps and cutters will be released instantly when the backward movement of the plate begins, thus avoiding the necessity of providing a movable support to the second set of pawls.

I do not wish to limit myself to the precise form of devices shown, nor the exact manner of operating them, as these may be varied as mechanical skill may dictate without departing from the fundamental principles of my invention. Thus the action of the parts might be reversed with good results, the nail-forming devices being carried by a fixed support and the actuating devices being moved against them, all the elements remaining the same as described above.

The abutment which operates the cutters for the heading action is slotted to permit the passage of the completed nail.

I claim as my invention—

1. In combination, two plates, one movable and the other fixed, cutting-dies supported from one of the said plates, and forcing-faces carried upon the other plate for causing the operation of said dies in the changing of the position of the two plates, and driving mechanism for the moving plate, all substantially as described.

2. In combination, two plates, one movable and the other fixed, cutting-dies supported from one of said plates, forcing-faces carried upon the other plate for causing the operation of said dies in the changing of position of the two plates, driving mechanism for the moving plate, and a feeding mechanism carried upon the movable plate, substantially as described.

3. In combination, substantially as described, a bed-plate and a supporting-plate in sliding connection therewith, driving mechanism for the sliding plate, gripping-jaws and cutting-dies supported therefrom, and forcing faces on the bed-plate for causing the operation of both jaws and cutters, substantially as described.

4. The combination, in a machine for making nails from wire, of a gripper for the wire, dies having longitudinal and lateral movement, a plate carrying the said gripper and dies, and a bed-plate having forcing or contact faces for causing the longitudinal movement of the dies, and an abutment to come in contact with the dies, with a driving-shaft and its connections, all substantially as described.

5. In combination, in a machine for making nails from wire, a gripper, dies arranged to move therewith and to swing inward, forcing-faces for causing the longitudinal movement, and an abutment arranged to press the dies against the gripper, with driving mechanism whereby the wire is held, severed, and the gripped end upset to form the head, all substantially as described.

6. In combination, a plate, B, having an abutment, a plate, A, in sliding connection with the plate B, a gripper to hold the wire, and dies arranged to move with the gripper to sever the wire, said movement being caused by forcing-faces on the plate B, said dies being hinged and normally held outward from the gripper, the gripper-face and dies being in line with the abutment, and mechanism for changing the position relatively of the plates, substantially as described.

7. The combination, substantially as described, of a bed-plate and a plate in sliding connection therewith, gripping-jaws, forcing-faces on the bed-plate for causing the gripping-jaws to operate, a pair of dies moving with the gripping-jaws and hinged to swing inward thereto, but held normally outward, and an abutment on the bed-plate arranged to press the dies against the face of the jaws.

8. In combination, the slides carried on the plate A, the gripping-jaws operated thereby, the dies hinged to the slide, with adjustable connections, the abutment to force the dies against the jaws, and the forcing-faces for causing the slides to operate, substantially as described.

9. In combination with the plates A and B, one movable longitudinally in relation to the other, laterally-movable gripping-jaws and dies carried on one plate, movable pawls carried on one plate, and the holding-grip for retaining the wire while the movable pawls retreat, substantially as described.

10. In combination, substantially as described, a fixed and movable plate, one carrying gripping-dies connected to slides moving across the line of movement of the plate and rollers on the other plate arranged to press the slides inward.

11. In combination with the base and moving plate, a pair of slides, gripping-jaws operated thereby, dies having beveled ends carried by the slides, springs to hold the dies away from the slides, and an abutment arranged to bear on the dies after they have severed the wire and force them against the end held in the grip, all substantially as described.

12. In combination with the plates A and B, one movable longitudinally in relation to the other, laterally-movable gripping-jaws and dies carried on one plate, feeding-pawls carried on the movable plate, and holding-pawls supported independently of said movable plate for retaining the wire while the feeding-pawls retreat.

13. In combination, the plates A and B, one movable in relation to the other, laterally-movable gripping-jaws and dies carried on one plate, feeding-pawls carried on the movable plate, and holding-pawls supported independently of said movable plate and upon a movable support.

In testimony whereof I have signed my name to this specification in the presence of two subscribing witnesses.

HENRY ESSEX.

Witnesses:
C. L. STURTEVANT,
WALTER DONALDSON.